United States Patent Office 3,725,093
Patented Apr. 3, 1973

3,725,093
HIGH LEAD CONTENT GLASS COMPOSITION FOR TELEVISION NECK TUBES
Richard D. Sanner, Sylvania, Ohio, assignor to Owens-Illinois, Inc.
No Drawing. Filed June 19, 1970, Ser. No. 47,870
Int. Cl. C03c 3/10, 3/04, 3/30
U.S. Cl. 106—53          8 Claims

ABSTRACT OF THE DISCLOSURE

Lead glass compositions which can be used for the manufacture of the neck portion of the television tube which exhibit high X-ray absorption characteristics. These lead glasses have desirable high and low temperature viscosity properties, as a result of which they can be readily drawn and worked and are compatible with existing glass compositions used for making other components of the television picture tube.

DESCRIPTION OF THE INVENTION

Television tubes are comprised of a faceplate, funnel, neck, and electron gun. The electron gun emits radiation, characterized as X-rays. Exposure to X-rays may be hazardous, especially for service personnel who are in rather consistent and close proximity to the electron gun. Thus, it has been found desirable to manufacture a component of the television tube, known as the neck, from a glass which would have a substantially high ability to absorb radiation.

Various types of X-ray barrier glass have been known in the prior art; however, the conventional manufacturing process for X-ray tubes has certain specific limitations as to the viscosity, strain point, annealing point, fiber-softening point and expansion coefficient, density and liquidus temperature.

Also, the neck area must be mated with the electron gun and with the funnel of the television tube. This requires that coefficients of expansion and other characteristics be compatible so that the television tube will have at least the requisite strength to resist atmospheric pressure when it is eventually evacuated and operated under high vacuum conditions.

The present invention relates to a glass composition having a high percentage of lead but retaining higher viscosity at equivalent temperatures than glasses with an equivalent lead content.

The present invention provides a glass composition having high efficiency in absorbing X-ray radiation.

The present invention provides a high lead glass composition having desirable forming, sealing and devitrification characteristics of prior art glass compositions with lower lead content.

The present invention provides a glass composition having a calcium oxide content for optimizing low temperature viscosity characteristics, while minimizing deleterious devitrification characteristics.

The present invention provides a glass composition containing an alumina content between 0.75 weight percent and 5.0 weight percent and lead content of about 30 through approximately 40 weight percent content.

This invention relates to glass compositions wherein calcium oxide is present in an amount of about 0.5 to 3.0 weight percent as a replacement for the combination of calcium oxide and magnesium oxide in the dolomitic ratio. The substitution of calcium oxide brings about a lowering of the liquidus temperature. The glass composition of the invention further contains alumina in the amount of between 0.75 weight percent and 5.0 weight percent and have a lead content of approximately 30 to approximately 40 weight percent.

It is also an object of this invention to increase the viscosity by the addition of alumina in the formulation.

Objects and advantages of the invention will become apparent from a consideration of the accompanying specification and claims.

It was known in the prior art that the addition of a higher lead content to a glass composition will increase the X-ray absorbing characteristics of a glass. However, the higher lead content results in a reduction in the viscosity of the glass which is detrimental to the drawing and reworking and sealing operations in the manufacture of television tube necks, unevacuated bulbs, and finished picture tubes.

Because it has been heretofore well known that the addition of lead oxide characteristically lowers the viscosity in glasses in which the expansion has been held constant, it was discovered that to counteract that effect, constituents including CaO, MgO, ZrO, BaO and SrO may be added to the composition to increase the lower temperature viscosity, and $Al_2O_3$ may be added to increase the high temperature viscosity.

It was further discovered that the $Al_2O_3$ content upper limit is critical in obtaining required liquidus temperatures in this higher lead content glass. Alumina content between about 0.75 weight percent and 5 weight percent was found desirable for 30 to 40 weight percent lead oxide glasses. This glass composition, having a higher lead content, consequently, exhibited desirable higher X-ray absorption characteristics. However, as an unexpected result of this invention, the viscosity characteristics and sealing characteristics are maintained closely to the type of glass commonly in use in the television tube neck manufacturing and reworking operations. Hence, the ability to use present redrawing equipment provides a substantial economic savings to the industry.

The glass composition of this invention was prepared and tested according to the following procedures.

Fifteen-pound batches of commercially prepared raw materials were weighed and blended by mechanical stirring. The melt was heated to a melting temperature and fritted by pouring into cold water. The frit was then re-melted and brought to a melting temperature in an electrically fired furnace to minimize lead volatization. The melt was then poured into a large slab. The slab was then annealed in an annealing furnace. Chemical analyses for silica, lead oxide, and alumina were done by what is known conventionally as a wet method of testing. Analysis for sodium oxide, potassium oxide, lead oxide, calcium oxide, and magnesium oxide were done by an atomic absorption method. The physical properties including annealing point, working point, fiber-softening point, and viscosity were determined by standard tests in the industry such as those of the American Society for Testing Materials tests known as (A.S.T.M.).

When making glasses to be sealed to other glasses, accurate matching of expansion and contraction characteristics are necessary for a proper seal. Necks are sealed to funnels in making television bulbs. Therefore, the sealing characteristic must match to insure proper strength when the bulb is evacuated. A method of determining and measuring relative coefficients of expansion and contraction of the glass pieces to be sealed in a thermally induced manner is by measuring the compressive and tensile stresses induced between the glass being tested and the standard glass. This test is characterized by measuring birefringence of the joined glasses using a seal polarimeter, a common industry practice.

The composition of this invention contains the following constituents in ranges expressed in approximate weight percent:

| Ingredient: | Weight percent (range) |
|---|---|
| $SiO_2$ | 42–57 |
| $Al_2O_3$ | 0.75–5 |
| $Na_2O$ | 1–3 |
| $K_2O$ | 10–13 |
| CaO | 0–3 |
| MgO | 0–2 |
| PbO | 31–36 |
| Fining agents | 0–2 |

Another composition of the present invention consists essentially of 42 to 57 weight percent $SiO_2$, 0.75 to 5 percent $Al_2O_3$, 1 to 3 percent $Na_2O$, 10 to 13 percent $K_2O$, 31 to 36 percent PbO and 0.5 to 3 percent CaO.

The preferred optimum composition is set forth below, each ingredient being listed in its approximate weight percent based on chemical analyses.

| Ingredient: | Preferred optimum |
|---|---|
| $SiO_2$ | 47.55 |
| $Al_2O_3$ | 3.95 |
| $Na_2O$ | 1.53 |
| $K_2O$ | 11.56 |
| CaO | 2.44 |
| MgO | 0.02 |
| PbO | 32.35 |
| $Sb_2O_3$ | 0.12 |
| $As_2O_3$ | 0.38 |

This composition provided a glass with a fiber-softening point of about 665° C., an annealing point of about 484° C., a strain point of about 440° C., an annealed density of 3.224 grams per cubic centimeter and sealing characteristics compatible with other tube components.

It had a viscosity in poises of:

| Viscosity | ° C. |
|---|---|
| $10^{2.0}$ | 1418 |
| $10^{2.5}$ | 1274 |
| $10^{3.0}$ | 1160 |
| $10^{4.0}$ | 9.85 |
| $10^{5.0}$ | 863 |
| $10^{6.0}$ | 771 |
| $10^{7.0}$ | 702 |
| $10^{7.6}$ | 666 |

The weight percentage combination of $Al_2O_3$ and CaO within the high lead composition are adjusted to attain a higher viscosity at equivalent temperatures than glasses with a higher lead content, i.e., to obtain as high a low temperature viscosity as possible and as high a high temperature viscosity while maintaining the devitrification characteristics suitable for the commercial television tube process. Relative amounts of $Na_2O$ and $K_2O$ in the composition are adjusted to obtain the desired sealing characteristics as well as electrical resitivity characteristics using such methods which are presently known in the art of manufacturing television tubes and components.

The following Table I summarizes Examples I–VII showing examples of the composition and combination with fining agents.

TABLE I.—COMPOSITION WEIGHT PERCENT

| | I | II | III | IV | V | Ranges |
|---|---|---|---|---|---|---|
| $SiO_2$ | 46.0 | 46.25 | 45.0 | 48.0 | 47.5 | 45–48 |
| $Al_2O_3$ | 2.5 | 2.5 | 5.0 | 4.0 | 4.0 | 2.5–5 |
| $Na_2O$ | 1.5 | 1.25 | 2.0 | 1.5 | 1.5 | 1.25–2 |
| $K_2O$ | 10.0 | 11.5 | 10.5 | 12.5 | 11.5 | 10–12.5 |
| PbO | 36.0 | 35.0 | 36.0 | 31.0 | 32.5 | 31–36 |
| CaO | 2.0 | 3.0 | 1.0 | 2.0 | 2.5 | 1–3 |
| MgO | 1.5 | | | | | 0–1.5 |
| $As_2O_3$ | | 0.2 | | 1.0 | | 0–1 |
| $Sb_2O_3$ | 0.5 | 0.3 | 0.5 | | 0.5 | 0–0.5 |
| F.S.P., ° C. | 662 | 665 | 649 | 665 | 665 | |
| A.P., ° C. | 481 | 480 | 467 | 480 | 484 | |
| Working point, ° C. | 980 | 985 | 1,000 | 1,000 | 988 | |
| Seal vs. P.A., p.s.i. | 480C | 2 | 160C | 500T70T | 130C | |

A determination of the effectiveness of the composition as in absorbing X-rays was made using the following test procedure, known as the "X-ray Transmission Test." The test set-up employs a conventional color television gun as a source of X-radiation. A piece of the subject glass about .100 inch thick is interposed between the X-ray source and a suitable X-ray detection device (ionization gauge or survey meter). The X-radiation level measured by the meter with the subject glass interposed is compared with the level observed with the subject glass removed. A known standard sample is also interposed, and the data thus obtained give a valid indication of the ability of the subject glass to absorb X-rays in the 0.3 to 0.8 angstrom wave length range. The X-ray attenuation thus measured is expressed as "X-ray transmission value at .100 inch thickness."

The transmission characteristic of this invention was about 0.0016 mr./hr.

The prior art glass having the same working characteristics, but a lower lead content, had a transmission of about 0.58 hr./hr.

This demonstrates that the improved composition of this invention provides a decrease of about 380-fold in X-ray transmission.

This improved composition demonstrates remarkable X-ray absorbing characteristics, while exhibiting characteristics of annealing point, softening point, and sealing characteristics compatible with prior art glasses.

As may be seen from the foregoing, the glasses of the present invention generally have a softening point range of at least about 650° C., and annealing point of about at least 465° C., and a working point corresponding to the viscosity of $10^4$ poises at a temperature of at least 965° C. Also, the glasses have an X-ray absorption characteristic capable of absorbing X-rays in the 0.3 to 0.8 angstrom wave length range of at least .005 mr./hr.

What is claimed is:

1. A high lead content glass composition wherein said glass consists essentially of 42 to 57 weight percent $SiO_2$; 0.75 to 5% $Al_2O_3$; 1 to 3% $Na_2O$; and 10 to 13% $K_2O$; 31 to 36% PbO; and 0.5 to 3% CaO; having a softening point range of at least about 650° C., an annealing point of about at least 465° C., and having a working point corresponding to the viscosity of $10^4$ poises at a temperature of at least 965° C.

2. A high lead content glass composition wherein said glass consists essentially of 42 to 57 weight percent $SiO_2$; 0.75 to 5% $Al_2O_3$; 1 to 3% $Na_2O$; and 10 to 13% $K_2O$; 31 to 36% PbO; and 0.5 to 3% CaO; having from about 0.1 to 2.0 weight percent of a fining agent, and a softening point range of at least about 650° C., an annealing point of about at least 465° C., and having a working point corresponding to the viscosity of $10^4$ poises at a temperature of at least 965° C., having an X-ray absorbing characteristic at least .005 mr./hr.

3. A high lead content glass composition wherein the glass composition consists essentially of, by weight, 45 to 48 percent $SiO_2$; 2.5 to 5 percent $Al_2O_3$; 1.25 to 2 percent $Na_2O$; 10 to 12.5 percent $K_2O$; 31 to 36 percent PbO; 1 to 3 percent CaO; 0–1.5 MgO; 0 to 1 percent $As_2O_3$; and 0 to 0.5 percent $Sb_2O_3$, having a softening point range of at least about 650° C., an annealing point of about at least 465° C., and having a working point corresponding to the viscosity of $10^4$ poises at a temperature of at least 965° C.

4. The high lead content glass composition of claim 3 consisting essentially of 46 weight percent $SiO_2$; 2.5 weight percent $Al_2O_3$; 1.5 weight percent $Na_2O$; 10 weight percent $K_2O$; 36 weight percent PbO; 2 weight percent CaO; 1.5 weight percent MgO; and 0.5 weight percent $Sb_2O_3$.

5. The high lead content glass composition of claim 3 consisting essentially of 46.25 weight percent $SiO_2$; 2.5 weight percent $Al_2O_3$; 1.25 weight percent $Na_2O$; 11.5 weight percent $K_2O$; 35 weight percent PbO; 3 weight percent CaO; 0.2 weight percent $As_2O_3$; and 0.3 weight percent $Sb_2O_3$.

6. The high lead content glass composition of claim 3 consisting essentially of 48 weight percent $SiO_2$; 4 weight percent $Al_2O_3$; 1.5 weight percent $Na_2O$; 12.5 weight percent $K_2O$; 31.0 weight percent PbO; 2 weight percent CaO; and 1 weight percent $As_2O_3$.

7. The high lead content glass composition of claim 3 essentially of 48 weight percent $SiO_2$; 4 weight percent $Al_2O_3$; 1.5 weight percent $Na_2O$; 12.5 weight percent $K_2O$; 31.0 weight percent PbO; 2 weight percent CaO; and 1 weight percent $As_2O_3$.

8. The high lead content glass composition of claim 3 consisting essentially of 47.5 weight percent $SiO_2$; 4 weight percent $Al_2O_3$; 1.5 weight percent $Na_2O$; 11.5 weight percent $K_2O$; 32.5 weight percent PbO; 2.5 weight percent CaO; and 0.5 weight percent $Sb_2O_3$.

References Cited
UNITED STATES PATENTS

| | | | |
|---|---|---|---|
| 2,389,305 | 11/1945 | Goodwin | 106—53 |
| 2,465,084 | 3/1949 | Greiner | 106—53 |
| 3,464,932 | 9/1969 | Connelly et al. | 106—53 X |

FOREIGN PATENTS

| | | | |
|---|---|---|---|
| 734,444 | 8/1955 | Great Britain | 106—53 |
| 58,136 | 8/1946 | Netherlands | 106—53 |
| 764,575 | 12/1956 | Great Britain | 106—53 |

HELEN M. McCARTHY, Primary Examiner

M. L. BELL, Assistant Examiner

U.S. Cl. X.R.

220—2.1

UNITED STATES PATENT OFFICE
CERTIFICATE OF CORRECTION

Patent No. 3,725,093      Dated April 3, 1973

Inventor(s) Richard D. Sanner

It is certified that error appears in the above-identified patent and that said Letters Patent are hereby corrected as shown below:

Col. 3, line 54, "9.85" should be --985--; Col. 4, TABLE I last line of Table, should be as follows: Under Col.I,--480C--; Under Col.II, --160C--; Under Col. III, --500T--; Under Col. IV, --270T-- and Under Col. V --130C--; Col. 4, line 49, "mr./hr." should be--mR/hr.--; Col. 5, Claim 6, should be rewritten corrected as follows: --The high lead content glass composition of claim 3 consisting essentially of 45 weight percent $SiO_2$; 5.0 weight percent $Al_2O_3$; 2 weight percent $Na_2O$; 10.5 weight percent $K_2O$; 36 weight percent PbO; 1 weight percent CaO; and 0.5 weight percent $Sb_2O_3$.-- .

Signed and Sealed this seventeenth Day of February 1976

[SEAL]

Attest:

RUTH C. MASON
*Attesting Officer*

C. MARSHALL DANN
*Commissioner of Patents and Trademarks*

Disclaimer 3,725,093.—*Richard D. Sanner*, Sylvania, Ohio. HIGH LEAD CONTENT GLASS COMPOSITION FOR TELEVISION NECK TUBES. Patent dated Apr. 3, 1973. Disclaimer filed Sept. 22, 1977, by the assignee, *Owens-Illinois, Inc.*

Hereby enters this disclaimer to claims 1 through 8 of said patent.

[*Official Gazette November 29, 1977.*]